United States Patent [19]  [11] 3,943,262
Winkler et al.  [45] Mar. 9, 1976

[54] PROCESS FOR THE PRODUCTION OF A DYED EDIBLE FOOD CASING

[75] Inventors: Bruno Winkler, Weinheim-Oberflockenbach; Bernd Mangei, Waldmichelbach; Dieter Fritz, Weinheim, all of Germany

[73] Assignee: Naturin-Werk Becker & Co., Weinheim, Germany

[22] Filed: Sept. 12, 1974

[21] Appl. No.: 505,444

[30] Foreign Application Priority Data
Mar. 11, 1974 Germany............................ 2411587

[52] U.S. Cl. ................ 426/250; 426/140; 426/277; 426/540
[51] Int. Cl.² ........................................ A22C 13/00
[58] Field of Search ........... 426/105, 135, 138, 140, 426/177, 250, 277, 540

[56] References Cited
UNITED STATES PATENTS
3,860,728  1/1975  Tanner et al. ...................... 426/105

*Primary Examiner*—Hyman Lord
*Attorney, Agent, or Firm*—Burgess, Dinklage & Sprung

[57] ABSTRACT

Dyed edible food casings, e.g. sausage casings, are produced by applying an edible dye to an edible carrier therefor, fixing the dye on the carrier by use of a protein, and admixing the carrier with an edible casing material to form an extrudable composition. That composition is then used for production of the casing by extrusion. The dye can be a water soluble dye, a fat soluble but water insoluble dye, or a water insoluble, alkali soluble dye.

12 Claims, No Drawings

PROCESS FOR THE PRODUCTION OF A DYED EDIBLE FOOD CASING

BACKGROUND

This invention relates to edible food casings, especially for sausages, which are dyed with an edible dyestuff, and to a process for the manufacture of such casings.

The invention is an improvement in, or modification of, that forming the subject of co-pending application Ser. No. 340,776, filed March 13, 1973, now abandoned.

Edible food casings made of a skin fiber composition of animal origin (collagen) are known especially for sausages. Such casings are being used increasingly for the production of frankfurters and Vienna sausages, and their manufacture is described, for example, in German Pat. No. 972,854. Such collagen sausage casings range from practically colorless to pale yellow. In sausages where the casing is intended to be consumed, and especially in the case of the various scalding sausages, such as bockwurst, an increasing consumer preference towards a strongly colored sausage has become evident. Thus in some countries, such as USA, France and Great Britain, certain sausages, such as the well-known "hot dogs" are marketed dyed red. The red dyeing is effected together with the scalding or boiling process, by surface dyeing of the sausage casing, through addition of the dyestuff to the bath in which the filled sausage is scalded or boiled.

Such a method of dyeing has several disadvantages: First, uniform dyeing can be obtained only with great difficulty. The casing shows regions which are dyed more weakly or not at all, depending on how close together the sausages were laying and how adequately they have been wetted by the dyestuff liquor. Furthermore, the dyestuff tends both to bleed out and also to migrate into the sausage material. In spite of using the same dyestuff concentration, completely identical dyeing of successive batches is never achieved.

It has also been proposed to dye artificial sausage casings made of extrudable material which swells in water by dissolving edible dyestuffs soluble in fat or oil and distributing the resulting solution in the form of a "fat-in-water" emulsion in the raw material of the casings before they are shaped (Canadian Pat. No. 906 716, TEE-PAK).

In practice, dyed sausage casings produced in this manner have the disadvantage that during the scalding sausage preparation, under the action of hot air, steam, and scalding water, considerable portions of the dyed fats embedded in the casing material come into contact with the largely fatty sausage composition and color it. The result is a substantial disappearance of the coloring of the sausage casing and an undesired transfer of the dye to the periphery of the sausage material.

In said application Ser. No. 340,776, it is proposed to dye a sausage casing of edible material such as collagen or alginate, with an edible dyestuff, which represents a significant improvement in composition with the known dyed sausage casings as regards uniformity of dyeing and fixing the dye in the casing. The sausage casings according to said Ser. No. 340,776 are dyed with an edible, e.g. legally permitted, dyestuff (primarily a water-soluble dyestuff).

A proposed in the copending application, the dyeing may be effected by adding the dyestuff to the composition before extruding the tube, or by immersion of the tube, or by spraying the extruded tube with an aqueous dyestuff solution. Fixing the dyestuff on or in the casing may be effected, in the case of dyeing the extruded sausage casings, by employing as the dyes, substances which are cross-linkable under the action of heat, and/or the action of hardening or tanning agents. Such agents include proteins, cellulose, cellulose derivatives, pectins, alginates and structurally similar substances. Examples of proteins which may be used include gelatin, casein, and collagen. Swellable cellulose derivatives such as methyl cellulose, ethyl cellulose, are also suitable, as are gum arabic and guar gum as hardening or tanning agents similar to pectin. The quantity of any such substance added may be from 0.1 to 2% based on the aqueous dye solution. The dye baths produced in this manner may be regarded as dyed colloidal solutions of the proteins or polymeric carbohydrates. By adding tanning agents such as, for example, glutaraldehyde, glyoxal, or aluminium salts, the dyes can be cross-linked with the base substance of the tube, e.g. collagen. A certain degree of cross-linking and water-resistance can also be produced without using hardening or tanning agents, by exposure to hot air at 70° to 105° C for 4 to 10 hours.

If the dyestuff is added to the composition before tube formation, a very effective method of fixing the dyestuff consists of embedding it in a hydrophobic substance, for example, a fat, and then emulsifying it in this form into the composition to be extruded, preferably collagen. This method is particularly advantageous for water-soluble food dyestuffs.

As described in the said Ser. No. 340,776 a further improvement of the efficiency of the dyestuff, in conjunction with excellent fixing, is obtained if the water soluble dyestuff is first of all applied to a carrier and the dyed carrier is then surrounded by a hydrophobic encapsulating substance. Suitable dyestuff carriers comprise all insoluble, swellable or non-swellable materials which are edible or harmless. Preferably, a white or colorless carrier substance is used so that the color shade is not changed by the intrinsic coloration of the carrier. Examples of suitable carrier materials include cellulose and cellulose derivatives in the form of fibers or powders, starch powders, collagen powders and casein powders. Of course, mixtures of such materials can also be employed.

Advantageously the carrier, which consists, for example, of particles of a finely ground cellulose powder, is dyed with a relatively concentrated solution of the dyestuff in a hydrophobic encapsulating agent and then dried. Possible hydrophobic encapsulating substances comprise all those oils and fats which are customarily used in the foodstuff field, for example synthetic glyceride mixtures, sunflower seed oil, beef fat and lard. High-melting fats and waxes can also be used such as, for example, beeswax and paraffin, alone or mixed with the other fats and oils.

THE INVENTION

The present invention is based on the appreciation that the use of the dyestuff and its fixation in or on the food casing can be even further improved, in comparison with techniques disclosed in said Ser. No. 340,776 by applying the dyestuff to the surface of a solid carrier and subsequently fixing the dyestuff by sequestration with a protein. The sequestration involves the fixing of the dyestuff on the carrier so that it is more insoluble in water and in oil. It is believed the fixation involves the formation of a complex between the dye and the protein.

Dyestuffs suitable for this method include not only the aforementioned water-soluble materials, but also dyestuffs soluble in fat and insoluble in water or soluble in alkali. The improved properties of casings in which the dyestuff is fixed by sequestration (complex formation) after it has been applied to the carrier may be demonstrated by the fact that the casings can be boiled in water or treated with hot fat at 100°C without the slightest loss of color. By using the method of the present invention, the efficiency of a dyestuff, e.g. of a dyestuff soluble in oil, may be as much as doubled as compared with incorporating an oily solution of the dyestuff directly in the base material without using a carrier.

Small quantities of proteins, e.g. gelatin solution or suspensions of collagen fibers or casein in water, will generally suffice to fix the dyestuff on the surface of the carrier particles. It has been found that the fat-soluble carotinoids such as, for example $\beta$-carotene, astaxanthin, apocarotinal, canthaxantin, and capsanthin, and alkali-soluble dyestuffs which are insoluble in water, such as, for example, carmin, orcein, indigotine, curcumine and bixin form dyestuff complexes with proteins, which complexes are insoluble in water and acid and are suitable for the purposes of the invention. The proteins may subsequently be set further by alteration of the pH or by treatment with small quantities of a tanning substance, such as alum, formaldehyde or other bifunctional aldehydes.

To produce a good extrudable mix, the dyestuff on the carrier obtained as described herein may next be dispersed in an aqueous collagen suspension (for example, a 1% suspension) to fix the dyestuff on the carrier, and this dispersion can be subsequently worked, in a Z-mixer, into the base, e.g. collagen composition, of variable dry substance content, appropriate for the extrusion of dyed sausage collagen tubes.

The intensity of the coloring of dyed food casings made in accordance with the invention is surprisingly high, and it is possible to obtain satisfactory results using only 40 to 60% of the dyestuff expenditure needed for direct dyeing with an oil-in-water emulsion.

Dispersions of the dyestuff concentrates in, for example, 1% collagen suspensions are mutually very compatible, which makes it possible to produce any desired shade from yellow through orange, to red or ochre to mahogany brown.

Instead of collagen as the base material, other edible casing materials, for example, polyvinyl alcohol and alginate can also be dyed in accordance with the invention. Mixtures thereof can also be used.

The carrier material is preferably cellulose powder. It can also be wood pulp, starch powder, cellulose derivatives, e.g. methylcellulose, ethycellulose, carboxymethylcellulose, and casein powder, collagen powder, or a mixture of two or more of the said substances.

The dye before application to the carrier is preferably combined with a hydrophobic encapsulating agent, which can be any of such agents noted above in the discussion of Ser. No. 340,776.

Based on the carrier, the amount of the dye can be 1 to 15, preferably 2 to 10 wt.%, combined with 50 to 90 wt.%, based on the carrier of encapsulating agent. Still based on the carrier, the amount of protein employed for the fixation, for example in a 1% aqueous suspension, can be 10 to 90, preferably 25 to 50 wt.%. The fixing agent can be an aqueous suspension of the protein in which based on the water, the agent is 0.5 to 10 wt.%, preferably 1 to 5 wt.%. A 1% suspension works well. The proportion of the dye to base material, e.g. collagen paste which is dyed, can be 0.1 to 2 preferably 0.1 to 1.5 wt.% of dye based on the amount of base material. (dry weight)

Thus, the invention provides a process for the production of a dyed edible food casing comprising applying an edible dye to an edible carrier therefor in finely divided form so that the dye coats the carrier particles, fixing the dye on the carrier particles by contacting the coated particles with a protein, admixing the carrier with an edible casing material to form an extrudable composition, and extruding the resulting admixture to form the dyed casing. Desirably the dye is fixed, and is thereafter admixed with the edible casing or base material.

As noted above, by reason of the fixing, the water and fat solubility of the colors in the sausage casings provided by the invention is reduced to nearly absolute insolubility. When processing frankfurters or Vienna sausages there is no transition of color to the sausage emulsion and no bleeding out into the scalding water.

EXAMPLE 1

3.75 G of cellulose powder are moistened with 2.00 g of ethyl acetate. 3.3 g of a solution of 100 mg of $\beta$-carotene (crystalline, synthetic) in 3.2 g of liquid fat (sunflower oil) is introduced into the powder, which can still flow, in a high speed agitator. The resulting paste is dispersed in 100 ml of a 1% aqueous collagen suspension. The prepared dye mixture is worked into 500 g of 12% collagen paste in a Z-mixer.

It is possible to produce from a collagen composition dyed in this manner 68 g or 27.6 m of edible food casings of 23 mm calibre. The casings contain 0.145% carotene, are uniformly colored deep orange-red and the dye is resistant to the hot fat and water conditions encountered in the production of frankfurter and Vienna sausages.

EXAMPLE 2

4 G of potato or rice starch are moistened with 2 g of dioxane. 3.0 g of a 5%-solution of canthaxanthin in olive oil is worked into the still moist powder and the resulting paste is worked into 1500 g of a collagen paste having a solids content of 4%. In this manner, the canthaxanthin is fixed by complex formation with the collagen. The paste is extruded into tubular form and the extruded tube is coagulated in a coagulation bath consisting of an almost saturated aqueous solution of ammonium sulphate and sodium chloride, after which the tube is hardened in a hardening bath containing an aqueous alum solution. It is then washed, plasticised with glycerol or sorbitol, and finally dried.

EXAMPLE 3

3.75 G of cellulose powder are moistened with 2.00 g of ethyl acetate. 4.53 g of a mixture of 3.2 g of pig fat and 1.33 g of oleoresen (paprikaoleoresin or paprika extract) is introduced into the powder, which is still capable of flowing, and the resulting paste is dispersed by means of a high speed agitator into 100 ml of a 1% aqueous collagen suspension. The finished dye preparation is worked in a Z-kneader into 500 g of 12% collagen paste. It is possible to produce from a collagen composition dyed in this manner, which contains 68 g of solid substances, 34 m of edible sausage casings of a diameter of 21 mm. The casings are uniformly dyed brown-red. Under the conditions for the production of frankfurters and Vienna sausages they prove to be resistant to hot fat and hot water.

EXAMPLE 4

This example illustrates the production of a permanent coloring in a collagen sausage casing using a dyestuff insoluble in fat.

4.0 G of "carmine-fast" (cochineal extract) are dissolved in 200 ML of water with the addition of 2 ml of concentrated amonia solution. 30 g of cellulose powder are added to the bluish solution in a solvent, followed by 8 g of casein.

After uniform distribution of all components, dilute hydrochloric acid is added until the pH value reaches 3. The mixture is then allowed to stand for 45 minutes, after which it is introduced into and dispersed in 600 ml of a 1% collagen fiber suspension in a high speed agitator. The resulting colored paste is then worked portionwise into 3000 g of a 12% collagen paste in a Z-mixer. The dyestuff fixed to the carrier by the dyed protein confers on the 408 g of edible sausage casings of 30 mm diameter produced from the finished collagen composition, a luminous red color which proves to be resistant to hot fat and hot water in the course of the production of frankfurters and Vienna sausages.

In the case of oxidation-sensitive dyestuffs with conjugated C—C double bonds, such as carotinoids, the addition of an antioxidant in quantities of up to 5% by weight based on the dyestuff is recommended. Examples of antioxidants which may be used include vitamin E, vitamin C, citric acid and ascorbyl palmitate.

As illustrated in the foregoing examples, the dyestuff solution is distributed on a carrier, which is preferably finely ground and should be both fat- and water-insoluble, and is preferably powdered cellulose. For improved wetting of the powdered carrier with an oily dyestuff solution of, for example, carotene, the powder is preferably wetted initially with a polar solvent such as, for example, ethyl acetate or dioxane (Examples 1 and 2, respectively).

In the case of a solution in alkali of a dyestuff such as, for example, carmine (which may be prpared with a 1% aqueous solution of 25% ammonia), the resulting solution will itself wet cellulose powder thereby obviating the need for pretreatment.

Examples of other suitable carriers are wood pulp, starch powder, cellulose derivatives, e.g. methylcellulose, ethylcellulose, carboxymethylcellulose, and casein powder, collagen powder, or a mixture of two or more of the said substances. The swellability with water of the mentioned cellulose derivatives and proteins can be decreased by a hardening treatment with formaldehyde or other dialdehydes such as, for example, glyoxal or glutaraldehyde.

Very desirable results are obtained if the volume of the dyestuff solution applied to the carrier is so chosen in relation to the surface area of the carrier that a thin cohesive film of the dyestuff solution covers substantially the whole of said surface. For example, when the carrier is a powder of ground cellulose fibers of which the diameter is 10 to 12 $\mu$m and the mean length of the particles is 80 to 100 $\mu$m, the film thickness of the dyestuff may be in the order of 2 $\mu$m. If, for example, the carrier is finely ground powder of hardened collagen of a more sphaerical shape with a diameter of 20 to 30 $\mu$m, the film thickness of the dyeing composition is about 2 $\mu$m.

The carrier particles can be in the size range of 10 to 30 $\mu$m in diameter, preferably 10 to 15 $\mu$m, and 1 to 200 $\mu$m in length, preferably 5 to 150 $\mu$m. The mean particle size of a cellulose powder can be 10 to 12 $\mu$m in diameter and 20 to 150 $\mu$m in length, preferably 50 to 100 $\mu$m.

The film containing the dye is distributed over the surface of the carrier particles as a coating of thickness 0.5 to 5 $\mu$m, preferably 1 to 3 $\mu$m.

What is claimed is:

1. A process for the production of a dyed edible food casing comprising:
   a. applying an edible dye to an edible carrier therefor in finely divided form so that the dye coats the carrier particles,
   b. fixing the dye on the carrier particles by contacting the coated carrier particles with a protein from the group consisting of gelatin, collagen and casein for complex formation whereby the dye becomes fixed on the carrier, and thereafter
   c. admixing the carrier coated with the dye with an edible casing material to form an extrudable composition, and
   d. extruding the resulting admixture to form the dyed casing.

2. A process according to claim 1, wherein said casing is dried after extrusion.

3. A process according to claim 1, wherein said casing is subjected to at least one of a tanning step and a plasticizing step.

4. Process according to claim 1, wherein the casing contains a quantity of dye in the range of from 0.1 to 2 wt.%.

5. A process according to claim 1, wherein the edible dye is a water-soluble or water-insoluble, alkali-soluble dyestuff.

6. A process according to claim 5, wherein said edible dye is at least one of carmin, orcein, indigotin, curcumin and bixin.

7. A process according to claim 1, wherein said carrier material comprises cellulose.

8. A process according to claim 1, wherein said casing material comprises collagen, polyvinyl alcohol, or alginate.

9. A process according to claim 1, the fixing being effected with a 1% protein solution.

10. A process according to claim 1, wherein the edible dye combined with an edible hydrophobic encapsulating agent is applied to the carrier.

11. Process according to claim 1, the amount of dye being 0.1–2 weight percent of the dry weight of said extrudable composition, the amount of dye further being 1–15 weight percent of the carrier, and the amount of protein being 10–90 weight percent of the carrier.

12. Process according to claim 1, wherein the edible dye is a fat-soluble carotinoid.

* * * * *